(12) United States Patent
Heng

(10) Patent No.: US 10,105,998 B2
(45) Date of Patent: Oct. 23, 2018

(54) WIRELESS TIRE MONITORING DEVICE

(71) Applicant: Salutica Allied Solutions Sdn. Bhd., Lahat, Ipoh, Perak (MY)

(72) Inventor: Peter Sie Jeng Heng, Ipoh (MY)

(73) Assignee: Salutica Allied Solutions Sdn. Bhd., Lahat, Ipoh (MY)

( * ) Notice: Subject to any disclaimer, the term of this patent is extended or adjusted under 35 U.S.C. 154(b) by 0 days.

(21) Appl. No.: 15/525,071

(22) PCT Filed: Oct. 30, 2015

(86) PCT No.: PCT/MY2015/000087
§ 371 (c)(1),
(2) Date: May 7, 2017

(87) PCT Pub. No.: WO2016/072831
PCT Pub. Date: May 12, 2016

(65) Prior Publication Data
US 2018/0050569 A1 Feb. 22, 2018

(30) Foreign Application Priority Data
Nov. 7, 2014 (MY) .......................... PI 2014703332

(51) Int. Cl.
*B60Q 1/00* (2006.01)
*B60C 23/04* (2006.01)
*B60C 19/00* (2006.01)

(52) U.S. Cl.
CPC ...... *B60C 23/0452* (2013.01); *B60C 23/0408* (2013.01); *B60C 23/0433* (2013.01);
(Continued)

(58) Field of Classification Search
CPC ............ B60C 23/0452; B60C 23/0408; B60C 23/0496; B60C 23/0433; B60C 23/0444
(Continued)

(56) References Cited

U.S. PATENT DOCUMENTS 6,518,877 B1 * 2/2003 Starkey ............... B60C 23/0433
340/447
7,215,244 B2 * 5/2007 Katou ................. B60C 23/0408
340/442
(Continued)

FOREIGN PATENT DOCUMENTS

KR 10-2010-0109735 A 10/2010
WO 2002020287 A1 3/2002

OTHER PUBLICATIONS

International Preliminary Report on Patentability, International Patent Application No. WO/2016/072831, dated Feb. 23, 2017.
(Continued)

*Primary Examiner* — John A Tweel, Jr.
(74) *Attorney, Agent, or Firm* — Loza & Loza, LLP; Michael Fedrick

(57) ABSTRACT

The present invention relates to a wireless tire monitoring device for a vehicle. Accordingly, the wireless tire monitoring device (100) includes: a) a tire pressure/temperature signal transmitting device (110); b) at least one sensor unit (130) for measuring or detecting at least one parameter relating to the conditions of the tire (200); c) an antenna (150) for transmitting signal corresponding to the tire conditions; wherein the wireless tire monitoring device (100) is detachably mounted to a valve stem (210) of the tire (200) and being served as a cap for the valve stem (210); wherein the antenna (150) includes at least one curvature strip (151) configured at same axis (Z-Z) with the valve stem (210) so that it center axis aligns with the valve stem (210) of the tire (200); and wherein the antenna (150) and valve stem (210) share a common axis (X-X) of a tire wheel (230) and adapted to be revolved about the common axis (X-X) of the tire wheel (230).

6 Claims, 4 Drawing Sheets

(52) U.S. Cl.
CPC ...... *B60C 23/0444* (2013.01); *B60C 23/0496* (2013.01); *B60C 2019/004* (2013.01)

(58) Field of Classification Search
USPC ........................................ 340/438, 442, 447
See application file for complete search history.

(56) References Cited

U.S. PATENT DOCUMENTS

| | | |
|---|---|---|
| 2003/0112137 A1 | 6/2003 | Saheki |
| 2004/0031316 A1 | 2/2004 | Lundqvist |
| 2005/0190114 A1* | 9/2005 | Lin .................... B60C 23/0408 343/788 |
| 2012/0017672 A1 | 1/2012 | Uh et al. |
| 2012/0176233 A1 | 7/2012 | Petrucelli et al. |
| 2013/0234846 A1* | 9/2013 | Li ....................... B60C 23/0444 340/447 |

OTHER PUBLICATIONS

International Search Report, International Patent Application No. WO/2016/072831, dated Mar. 11, 2016.

* cited by examiner

WIRELESS TIRE MONITORING DEVICE

CROSS-REFERENCE TO RELATED APPLICATIONS

This application is the U.S. national stage of International Patent Application No. PCT/MY2015/000087, filed on Oct. 30, 2015 and entitled WIRELESS TIRE MONITORING DEVICE, which claims the benefit of priority under 35 U.S.C. § 119 from Malaysian Patent Application No. PI 2014703332, filed Nov. 7, 2014. The disclosures of the foregoing applications are incorporated herein by reference in their entirety.

FIELD OF INVENTION

The present invention relates generally to a wireless tire monitoring device for vehicle, and more particularly to a tire pressure/temperature signal transmitting device with a wireless interface.

BACKGROUND OF INVENTION

Arriving at the destination conveniently and safely is significantly important for the consumer group who own automobiles. Various types of automobiles or vehicles have become prerequisite traffic means or transporting equipment in the modern society. As a result, people are paying more and more attention to the safety of driving a vehicle.

One of the factors that affects the safety of driving is the functionality and proper operation of a vehicle's components (such as the braking system, tires, and ignition system), which is the most important link. In terms of tires, factors that affect the safety include tire pressure and tire temperature in addition to the grooves of the tire surface. As such, the tire pressure and/or temperature detection are crucial for a vehicle.

For example, if the tire pressure is 25% lower than the normally required tire pressure over a long period of time, the tire tends to have a dramatic temperature rise that may result in a blowout when the vehicle is moving at a high speed. If the tire pressure is too high or insufficient, it will cause damage to the tires.

Accordingly, should the tire pressure be 25% higher than a standard tire pressure value, the usable life of the tire will be shortened by 15%-20%, and when tire pressure is 25% lower than the standard value, the usable life of the tire shortens by 30%. Properly inflated tires not only have enhanced performance and safety in use, but also save more fuel and have prolonged tire life.

However, according to statistics, 20% of vehicles that are currently being used have insufficiently inflated tires. Moreover, tire temperatures also have an important influence on safe driving. The higher the tire temperature is, the lower the tire strength is. That is, tires with high tire temperature are more easily deformed. Moreover, tire wear increases by 2% when the tire temperature rises by 1° C.

Only when the tire pressure is at the right amount can the tire achieve its optimal performance. When the tire pressure is too high, the fraction of the tire when rolling becomes small. However, because the contact area between the tire and the ground is shortened, the middle of the tire is worn out quickly. Because the tire's surface tension expands, it creates damages as well as cracks. On the other hand, when the tire pressure is insufficient, the fraction of the tire when rolling becomes great, gas consumption increases, and the wear and tear on both sides of the tire increases relatively. As such, it increases the tire temperature and causes the surface or ply of the tire to exfoliate easily. When the tire temperature is overheated, a blow out may occur.

To ensure safe driving, various types of tire pressure monitoring systems have been developed. Some prior art references teach the incorporation of sensors, either to the tire proper or in proximity thereof, for measuring an operational parameter of the tire. Once the parameter is measured, it is transmitted to a terminal at a remote location, such as for example a maintenance facility, or to a monitor fixedly mounted to the vehicle.

A number of prior art devices have attempted to solve the problem of improperly inflated vehicle tires. Typically, these devices tend to monitor tire parameters, such as temperature and pressure, and provide an indication to the vehicle operator if any of the vehicle tires are improperly inflated or a potential safety hazard exists due to severe under inflation. Many of the prior art devices provide a remote sensor within each of the tires in addition to a transmitter for transmitting a signal to a centrally located receiving unit. However, some prior art devices have succumbed to at least one of the many varied challenges imposed upon a sensor subjected to the incredibly harsh operating environment of a vehicle tire.

A typical vehicle operating environment is not particularly amenable to the transmission and reception of digital or analog signals. Since some of the transmitter is often located entirely within a vehicle tire, powered by a battery separate from the vehicle battery, the receiver must be especially sensitive to the detection of relatively weak signals present in an electrically noisy milieu. Furthermore, the various electrically conductive components found on a typical vehicle may facilitate electrical communication but tend to hinder radio wave transmissions.

Another significant problem associated with the transmitter disposed upon or within the vehicle tire is that rotation of a transmitting antenna induces a "Doppler frequency shift" in the transmitted signal if the antenna is not oriented with its centre of mass along the axis of rotation of the vehicle tire. Thus, systems which utilize a valve stem of the tire as the transmitting antenna must provide complex detection circuitry to compensate for the Doppler shift. Alternatively, such systems may dramatically increase the redundancy of transmissions since much of the information will be filtered out as noise. Moreover, high rotational speed or revolution of the tire wheel may lead to inconsistency of signal transmission. Thus, inconsistent transmission and relatively weak signals may lead to loss of information or false information with regard to the tire pressure/temperature conditions of the vehicle.

In view of these and other shortcomings, it is desirous to provide a wireless tire monitoring device adapted to be detachably mounted to a valve stem of the vehicle tire, such that it provides a simple and effective device that provides both economy of manufacture and simplicity/convenience of use, and yet resists unfavourable weather conditions, dirt or debris contamination, while enabling the device to function reliably under conditions adverse to wireless transmissions, such as frequency shift induced by rotation of the wheel or Doppler shift. The present invention also facilitates prolonged periods of power consumption, and yet substantially reduces assembly and maintenance costs. The wireless tire monitoring device of the present invention and its combination of elements thereof will be described and/or exemplified in the detailed description.

SUMMARY OF THE INVENTION

The present invention relates to a wireless tire monitoring device for a vehicle. Accordingly, the wireless tire monitoring device includes: a) a tire pressure/temperature signal transmitting device; b) at least one sensor unit for measuring or detecting at least one parameter relating to the conditions of the tire; and c) an antenna for transmitting signals corresponding to the tire conditions; wherein the wireless tire monitoring device is detachably mounted to a tiltably extended valve stem of the tire and serves as a cap for the valve stem; wherein the antenna includes at least one curvature strip, either a circular, substantially circular, or semi-circular strip, adapted to be configured around the circumference of a battery, so that centre axis of the curvature strip lies along or is configured to be on the same axis (Z-Z) as the valve stem; wherein the antenna and the tiltably extended valve stem are adapted to be revolved about a common axis (X-X) of a tire wheel, such that a radial transmission of signals from the curvature strip is able to be channeled or directed to the vehicle body; and wherein such configurations are able to avoid any inducing of Doppler frequency shift to the transmitted signals so that any inconsistency or weak signals transmission, loss of information or false information relating to the condition of the tire are eliminated.

The tire pressure/temperature signal transmitting device is further equipped with a battery holder to accommodate a battery.

The tire pressure/temperature signal transmitting device is also equipped with a micro-controller. Accordingly, the micro-controller serves to process all related information received from the sensor unit and transmits the information to other associated units in a tire pressure monitoring system (TPMS) via the antenna.

In accordance with a preferred example of the present invention, the antenna is preferably electronically connected to a Bluetooth chip for Bluetooth pairing, wireless communication or encryption, and for transmitting wireless signal relating to the tire conditions, in between the tire pressure/temperature signal transmitting device and the other associated units in tire pressure monitoring system (TPMS). It will be appreciated that the antenna is being controlled by the micro-controller such that it facilitates prolonged periods of power consumption to continuously generate an ultra-low power consumption Bluetooth wave signal to extend the useful life of the battery.

The present invention consists of several novel features and a combination of parts hereinafter fully described and illustrated in the accompanying description and drawings, it being understood that various changes in the details may be made without departing from the scope of the invention or sacrificing any of the advantages of the present invention.

BRIEF DESCRIPTION OF THE DRAWINGS

The present invention will be fully understood from the detailed description given herein below and the accompanying drawings which are given by way of illustration only, and thus are not limitative of the present invention, wherein.

DETAILED DESCRIPTION OF THE PREFERRED EMBODIMENTS

The present invention relates to a wireless tire monitoring device, and more particularly to a tire pressure/temperature signal transmitting device which is capable of wirelessly interfacing with a tire pressure monitoring system (TPMS). Hereinafter, this specification will describe the present invention according to the preferred embodiments of the present invention. However, it is to be understood that limiting the description to the preferred embodiments of the invention is merely to facilitate discussion of the present invention and it is envisioned that those skilled in the art may devise various modifications and equivalents without departing from the scope of the appended claims.

The wireless tire monitoring device according to the preferred mode of carrying out the present invention will now be described in accordance to the accompanying drawings FIG. 1a to 3, either individually or in any combination thereof.

Figure 1A:
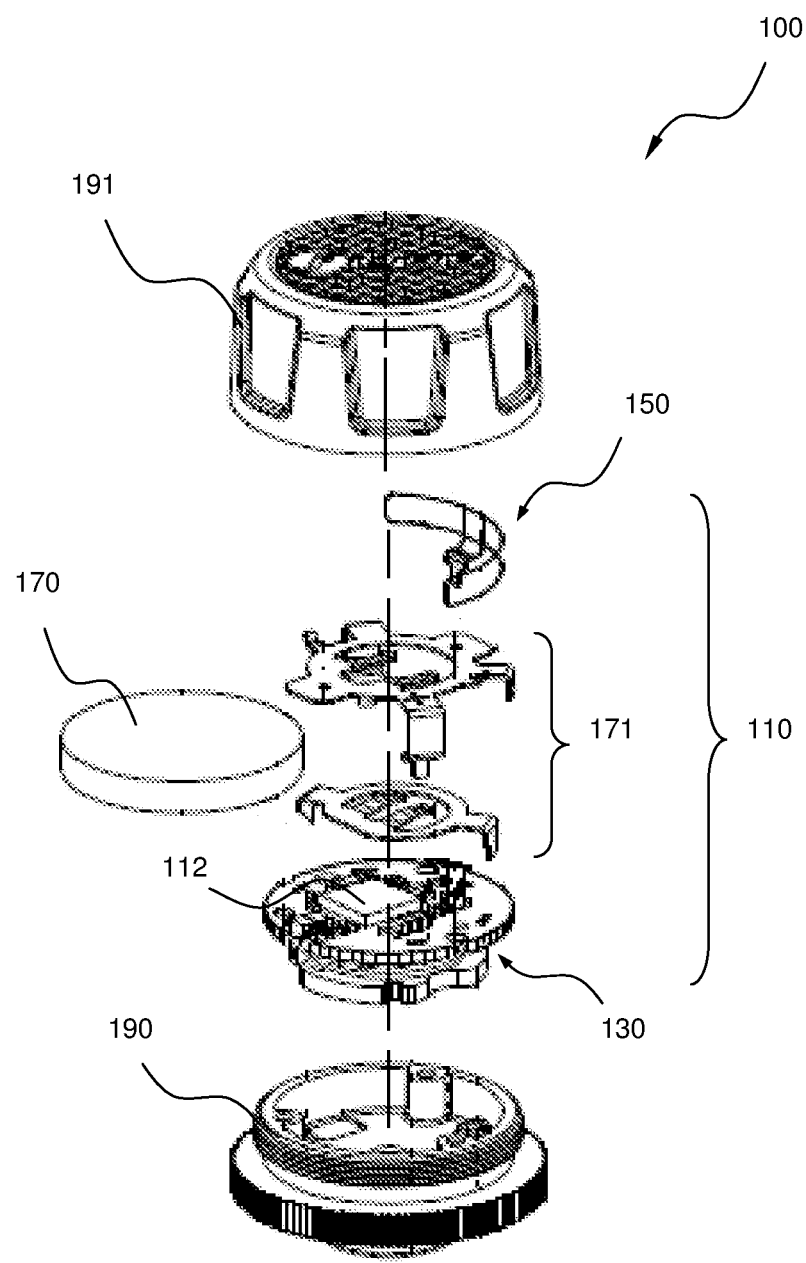
FIG. 1a is an exploded view in perspective of a wireless tire monitoring device, which is adapted to be detachably mounted to a valve stem of the vehicle tire in accordance with a preferred example of the present invention.
Figure 1B:
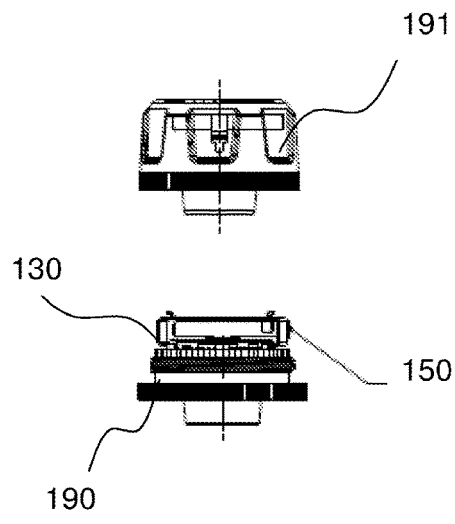
FIG. 1b is an exploded side elevation view of the wireless tire monitoring device in accordance with a preferred embodiment of the present invention.
Figure 1C:
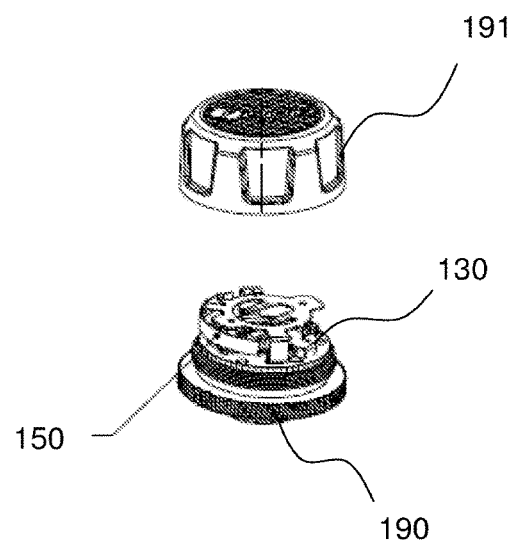
FIG. 1c is a partial assembly view in perspective of the wireless tire monitoring device of FIG. 1b according to a preferred example of the present invention.
Figure 1D:
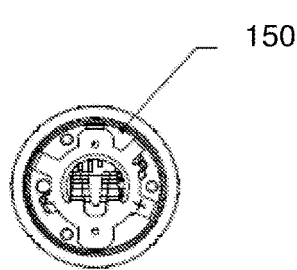
FIG. 1d is a top plan view of the sensor unit and antenna (150)
Figure 1E:
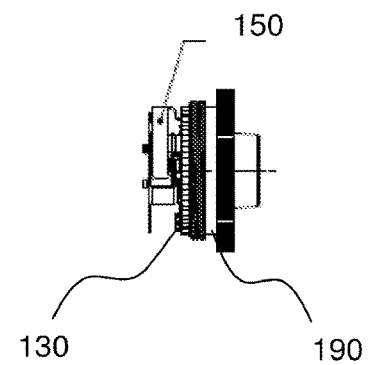
FIG. 1e is a side view of the sensor unit (130)
Figure 2A:
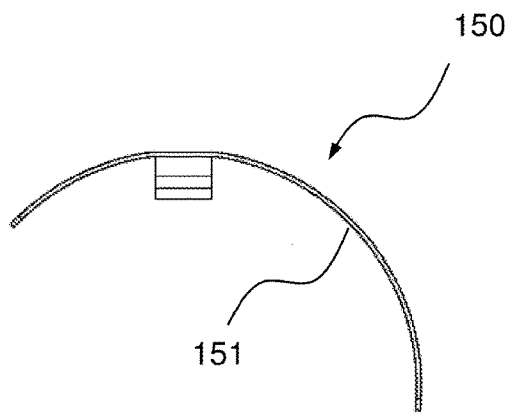
FIG. 2a is an enlarged plan view of a sensor antenna of the wireless tire monitoring device in accordance with a preferred example of the present invention.
Figure 2B:
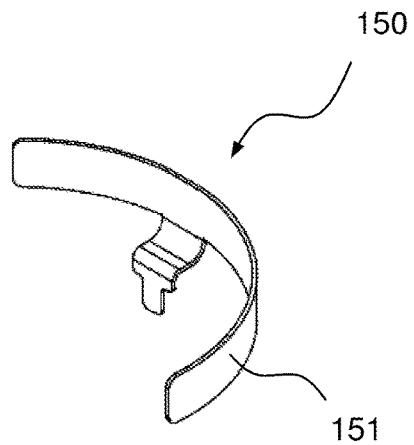
FIG. 2b is an enlarged view in perspective of the sensor antenna of FIG. 1b according to a preferred example of the present invention.
Figure 2C:
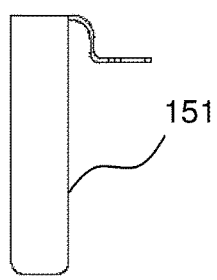
FIG. 2c is a side elevation view of the antenna (150)
Figure 2D:
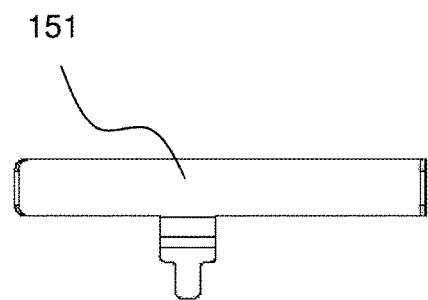
FIG. 2d is a side view of the antenna (150)

With reference to FIGS. 1a to 1c, the wireless tire monitoring device (100) in accordance with a preferred example of the present invention generally includes a tire pressure/temperature signal transmitting device (110), a sensor unit (130), and an antenna (150) for transmitting signal corresponding to the tire conditions.

Accordingly, the tire pressure/temperature signal transmitting device (110) includes at least one sensor unit (130) for measuring or detecting at least one parameter, such as for example, but not limited to, tire pressure, temperature, wheel speed, acceleration, distance information or any other preferred parameters relating to the conditions of the tire (200). It should be noted that the tire pressure/temperature signal transmitting device (110) is preferably disposed at each valve stem (210) of the tire (200), such that it enables to provide desired readings, information or parameters relating to the conditions of the tire (200).

Accordingly, the wireless tire monitoring device (100) is preferably detachably mounted to the valve stem (210) of the tire (200) and serves as a cap for the valve stem (210). Said wireless tire monitoring device (100) is preferably powered by a battery (170). By way of example but by way of limitation, on top of the sensor unit (130) is equipped with a battery holder (171) to accommodate the battery (170).

The tire pressure/temperature signal transmitting device (110) may also be provided with a micro-controller (112). Preferably, the micro-controller (112) is electronically connected to the sensor unit (130), to enable the sensor unit (130) to continuously detect the desired parameters relating to the conditions of the tire (200) and transmit the detected information to the micro-controller (112). Accordingly, the micro-controller (112) serves to process all related information received from the sensor unit (130) and transmits the information to other associated units (not shown) in a tire pressure monitoring system (TPMS) via the antenna (150).

The tire pressure/temperature signal transmitting device (110) may further include a Bluetooth chip with pairing capability to enable the tire pressure/temperature signal transmitting device (110) to communicate with or be paired with other associated units in the tire pressure monitoring system (TPMS).

In the preferred example, the antenna (150) is preferably electronically connected to the Bluetooth chip for Bluetooth pairing, wireless communication or encryption, and for transmitting wireless signals relating to the tire conditions, in between the tire pressure/temperature signal transmitting device (110) and the other associated units in the tire pressure monitoring system (TPMS). It should be noted that the antenna (150) is being controlled by the micro-controller (112) such that it facilitates prolonged periods of power consumption to continuously generate an ultra-low power consumption Bluetooth wave signal (300) to extend the useful life of the battery (170).

It should be noted that the antenna (150) includes at least one curvature strip (151) (see FIGS. 2a and 2b) adapted to be configured around the circumference of the battery (170). By way of example but not by way of limitation, the curvature strip (151) may be a circular, substantially circular, or semi-circular strip adapted to be configured along the circumference of the battery holder (171).

Figure 3:
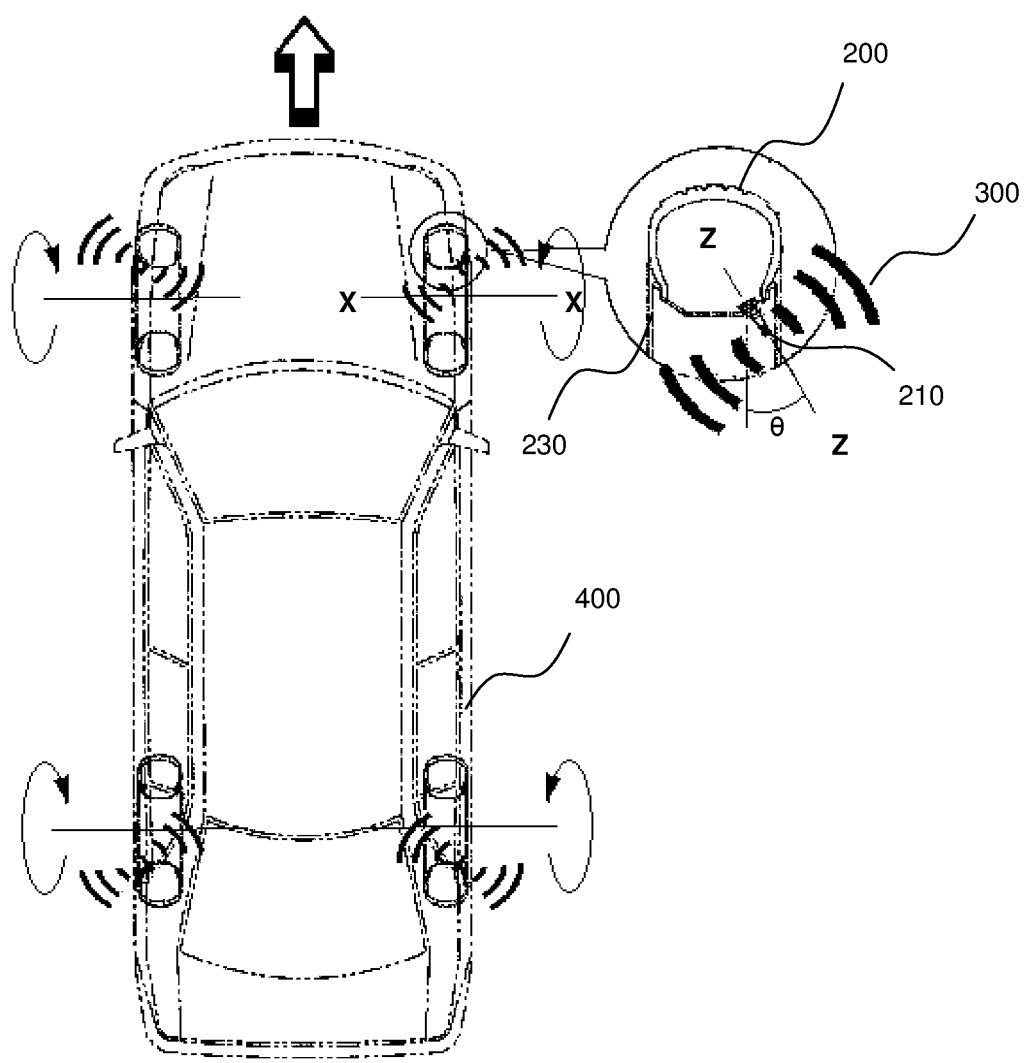
FIG. 3 illustrates the wireless tire monitoring device being installed at each valve stem of the tires of a car according to a preferred example of the present invention.

It should also be noted that said curvature strip (151) of the antenna (150) is preferably configured at same axis (Z-Z) with the valve stem (210) so that its centre axis aligns with the valve stem (210) of the tire (200) (refer to FIG. 3). As such, the antenna (150) and valve stem (210) share a common axis (X-X) of a tire wheel (230) and are adapted to be revolved about the common axis (X-X) of the tire wheel (230) when the vehicle (400) displaces.

Accordingly, in order to avoid inducing a Doppler frequency shift to the transmitted signal, the antenna (150) of the tire pressure/temperature signal transmitting device (110), which revolves about the common axis (X-X) of the tire wheel (230), is being oriented so that centre axis of the curvature strip (151) lies along the axis (Z-Z) of the valve stem (210). Because the valve stem (210) tiltably extends from the tire (200), a radial transmission of the signals from the curvature strip (151) of the antenna (150) is able to be channeled or directed to the vehicle body. As such, the curvature strip (151) of the antenna (150) enables the present device to eliminate any inconsistency or weak signal transmission. Thus, loss of information or false information relating to the conditions of the tire (200) may also be eliminated.

It will be appreciated that the tire pressure/temperature signal transmitting device (110) is preferably enclosed by a rigid cover (191). Accordingly, the rigid cover (191) is securely mounted to a receptacle (190) in an airtight and/or watertight engagement, such that it is capable to resist any unfavourable weather conditions, dirt or debris contamination, without affecting wireless transmission performance of the wireless tire monitoring device (100).

It should be noted that the arrangements or configurations of various units, components and/or elements used to carry out the above-mentioned embodiments are illustrative and exemplary only, and are not restrictive of the invention. One of ordinary skill in the art would recognize that those arrangements or configurations, components and/or elements used herein may be altered in a manner so as to obtain different effects or desired operating characteristics. As such, the above-described should not be construed as limiting in any way, but as a best mode contemplated by the inventor for carrying out the invention.

The invention being thus described, it will be obvious that the same may be varied in many ways. Such variations are not to be regarded as a departure from the principle and scope of the invention, and all such modifications as would obvious to one skilled in the art intended to be included within the scope of following claims.

The invention claimed is:

1. A wireless tire monitoring device for a vehicle, wherein the wireless tire monitoring device (100) includes:
    a) a tire pressure/temperature signal transmitting device (110);
    b) at least one sensor unit (130) for measuring or detecting at least one parameter relating to the conditions of the tire (200); and
    c) an antenna (150) for transmitting a signal corresponding to the tire conditions;
    wherein the wireless tire monitoring device (100) is detachably mounted to a tiltably extended valve stem (210) of the tire (200) and serves as a cap for the valve stem (210);
    wherein the antenna (150) includes at least one curvature strip (151), either a circular, substantially circular, or semi-circular strip, adapted to be configured around the circumference of a battery (170), so that a centre axis of the curvature strip (151) lies along or is configured to be on the same axis (Z-Z) as the valve stem (210);
    wherein the antenna (150) and the tiltably extended valve stem (210) are adapted to be revolved about a common axis (X-X) of a tire wheel (230), such that signals from the curvature strip (151) are able to be channeled or directed to the vehicle body; and
    wherein such configurations are able to avoid any inducing of a Doppler frequency shift to the transmitted signals so that any inconsistency or weak signal transmission, loss of information or false information relating to the condition of the tire (200) are eliminated.

2. The wireless tire monitoring device (100) according to claim 1, wherein the tire pressure/temperature signal transmitting device (110) is equipped with a battery holder (171) to accommodate the battery (170).

3. The wireless tire monitoring device (100) according to claim 1, wherein the tire pressure/temperature signal transmitting device (110) is equipped with a micro-controller (112).

4. The wireless tire monitoring device (100) according to claim 3, wherein the micro-controller (112) serves to process all related information received from the sensor unit (130) and transmits the information to other associated units in a tire pressure monitoring system (TPMS) via the antenna (150).

5. The wireless tire monitoring device (100) according to claim 4, wherein the antenna (150) is electronically connected to a Bluetooth chip for Bluetooth pairing, wireless communication or encryption, and for transmitting wireless signals relating to the tire conditions, in between the tire pressure/temperature signal transmitting device (110) and the other associated units in the tire pressure monitoring system (TPMS).

6. The wireless tire monitoring device (100) according to claim 5, wherein the antenna (150) is controlled by the micro-controller (112) such that it facilitates prolonged periods of power consumption to continuously generate an ultra-low power consumption Bluetooth wave signal (300) to extend the useful life of the battery (170).

\* \* \* \* \*